UNITED STATES PATENT OFFICE.

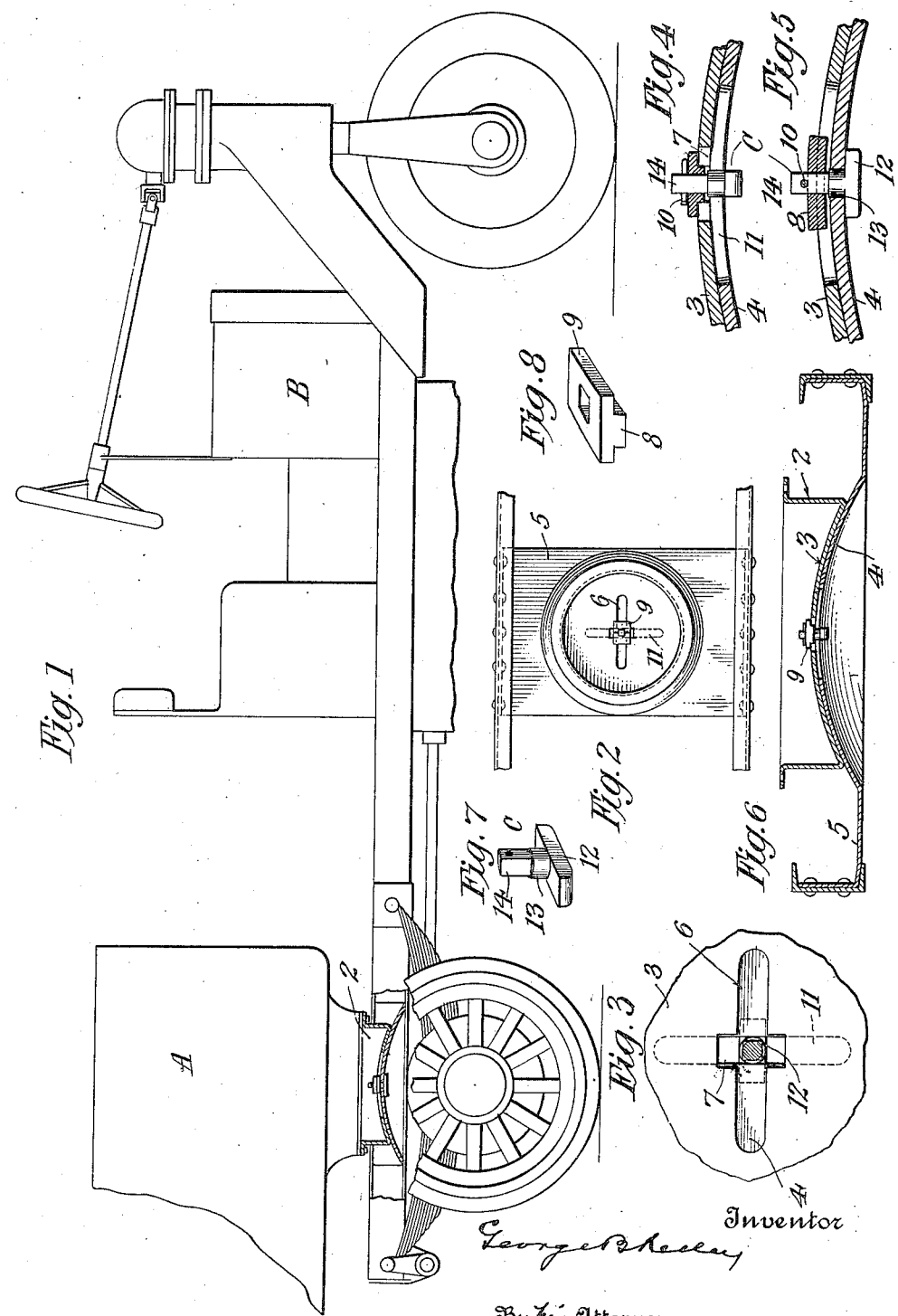

GEORGE B. KELLEY, OF FLUSHING, NEW YORK, ASSIGNOR TO TRANSPORT TRACTOR COMPANY, INC., OF LONG ISLAND CITY, NEW YORK, A CORPORATION OF NEW YORK.

FIFTH-WHEEL FOR AUTOMOBILE TRACTORS AND TRAILERS.

1,182,569.  Specification of Letters Patent.  Patented May 9, 1916.

Application filed November 19, 1915. Serial No. 62,374.

*To all whom it may concern:*

Be it known that I, GEORGE B. KELLEY, a citizen of the United States, residing in Flushing, county of Queens, and State of New York, have invented certain new and useful Improvements in Fifth-Wheels for Automobile Tractors and Trailers, of which the following is a specification.

My invention relates to improvements in automobile vehicles comprising a tractor and a trailer, and consists in an improved pivotal, or "fifth wheel," connection between the tractor and the trailer, as hereinafter shown, described, and claimed.

In the accompanying drawings, forming part of this specification, Figure 1 is a diagrammatic side elevation of the tractor and a part of the body of the trailer, the fifth wheel connection being shown in section; Fig. 2 is a detail plan view of the fifth wheel; Fig. 3 is a detail enlarged plan view of part of the same, some of the parts being removed to show the construction more clearly; Fig. 4 is a detail cross section of the fifth wheel; Fig. 5 is a similar detail taken at right angles to the section of Fig. 5; Fig. 6 is a detail cross section of the connected portions of the body of the tractor and trailer taken diametrically through the fifth wheel; Fig. 7 is a detail of the king-bolt for the fifth wheel; and Fig. 8 is a detail of the slidable block for king-bolt.

The interconnecting parts of the tractor B and trailer A are made preferably of heavy sheet metal, the depending part or bolster 2 of the trailer serving as the upper concave or socket member 3 of the fifth wheel. The socket member 3 rests upon the ball member 4 formed integral with the body 5 of the tractor B. The socket member is provided with a longitudinal slot 6 and having at its center a cross slot 7 adapted to receive the head 12 of the king-bolt C in assembling the parts.

The block 9 has a rib 8 and is curved to conform to the shape of the member 3, the rib 8 working in the slot 6. The block 9 also has a square opening to receive the square tip of the king-bolt C, the bolt being secured in place by the pin 10 bearing upon the top of the block 9. The ball member 4 of the connection is provided with a slot 11, similar to the slot 6, but arranged at right angles therewith when the parts are assembled in normal position. The king-bolt C is formed with a T-shaped head 12, its body 13 being cylindrical and fitted to slide freely in the slot 11, the tip 14 being squared to fit the opening in the block 9 with the block bearing upon the shoulder of the body part of the bolt. The parts are assembled as follows, viz: The ball and socket members being placed together in working position, the king-bolt C is passed head downward through the cross slot 7 of the socket member 3 and through the slot 11 in the ball member 4, and then turned at right angles so as to engage the side walls of the slot 11. The block 9 is then seated on the member 3 its rib 8 arranged in the slot 6 and over the squared end of the king-bolt, and the pin 10 is inserted to hold the bolt in place. The parts thus constitute a universal joint permitting the ball and socket members to move freely upon each other in all directions to adjust themselves to the relative positions of the tractor and trailer, the T-shaped head of the king-bolt engaging the walls of the slot in which it is free to slide, and the block sliding freely along the slot 6 to permit the king-bolt to run freely in the slot 11 with the relative movement of the ball and socket members. Thus in the operation of the machine, the tractor and trailer have free pivotal movement upon the king-bolt, and also relative freedom of movement laterally to compensate for different elevations of the wheels of the tractor and trailer in passing over elevations or depressions.

Having thus described my invention, what I claim and desire to secure by Letters Patent is:

1. A fifth wheel for vehicles of the class described, comprising oppositely slotted ball-and-socket members and a king-bolt extending through said slots interconnecting said members.

2. A fifth wheel of the class described, comprising oppositely slotted ball-and-socket members, a king-bolt therefor having a T-shaped head adapted to be passed through said slots and turned into engagement with the slot in the bottom member, and a block slidable in the slot of the top member and engaging said bolt.

3. A fifth wheel of the class described comprising oppositely slotted sheet-metal ball-and-socket members, the slot in the upper member having a central cross slot, a king-bolt having a T-shaped head adapted to be dropped through the slots in the members and turned transverse of the slot in the bottom member, a block adapted to be secured upon the top of said bolt and free to slide in the slot of the top member in a direction transverse of the slot in the bottom member.

In witness whereof, I have hereunto set my hand, at Long Island City, in the county of Queens and State of New York, this third day of November, 1915.

GEORGE B. KELLEY.

Copies of this patent may be obtained for five cents each, by addressing the "Commissioner of Patents, Washington, D. C."